(No Model.)

G. D. BURTON.
CARBON ELECTRODE FOR LAMPS.

No. 322,895. Patented July 28, 1885.

Witnesses.
Fred L. Emery.
John F. C. Varinkirk

Inventor.
George D. Burton
By Crosby Gregory
attys

UNITED STATES PATENT OFFICE.

GEORGE D. BURTON, OF NEW IPSWICH, NEW HAMPSHIRE.

CARBON ELECTRODE FOR LAMPS.

SPECIFICATION forming part of Letters Patent No. 322,895, dated July 28, 1885.

Application filed December 19, 1882. (No model.)

*To all whom it may concern:*

Be it known that I, GEORGE D. BURTON, of New Ipswich, county of Hillsborough, State of New Hampshire, have invented an Improvement in Carbons or Electrodes for Electric Lamps, of which the following description, in connection with the accompanying drawings, is a specification, like letters on the drawings representing like parts.

My invention, relating to a carbon or electrode to be used in an electric-arc lamp, is embodied in a carbon provided with a metallic conductor consisting of a wire embedded in the carbon for a portion of its length, and a metallic covering on the remainder of the carbon, the said internal wire and external covering having metallic connection.

Figure 1:
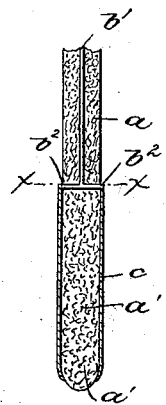
Figure 2:

Figure 1 is a longitudinal section of a carbon or electrode for an electric lamp made in accordance with this invention, and Fig. 2 a transverse section thereof on line $x\ x$.

The carbon or electrode $a$, of any suitable or usual size, shape, or material, is provided with a central wire or metallic coil, $b'$, extending through a portion of the length of the carbon $a$, and provided with branches $b^2$, extending to the surface of the said carbon at an intermediate point in its length.

The branches $b^2$ are connected with an external covering, $c$, of metal, extending over the remainder of the carbon, the tapering point $a'$ of which is left exposed or uncovered, being intended to come in contact with the opposite carbon before the arc is established.

I claim—

An improved article of manufacture, a carbon or electrode for an electric lamp provided with an internal metallic conductor extending through a portion of its length, and an external conductor covering the remainder of the length of the said carbon and having metallic connection with the internal conductor, substantially as described.

In testimony whereof I have signed my name to this specification in the presence of two subscribing witnesses.

GEO. D. BURTON.

Witnesses:
 JOS. P. LIVERMORE,
 W. H. SIGSTON.